(12) United States Patent
Poulad et al.

(10) Patent No.: US 11,099,387 B2
(45) Date of Patent: Aug. 24, 2021

(54) ACTIVE DISPLAY ALIGNMENT FOR MULTI-DISPLAY DEVICE

(71) Applicant: Microsoft Technology Licensing, LLC, Redmond, WA (US)

(72) Inventors: Navid Poulad, San Jose, CA (US); Teresa Tombelli, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 16/288,592

(22) Filed: Feb. 28, 2019

(65) Prior Publication Data

US 2020/0278544 A1    Sep. 3, 2020

(51) Int. Cl.
*G02B 27/01* (2006.01)
*G02B 27/18* (2006.01)

(52) U.S. Cl.
CPC ..... *G02B 27/0172* (2013.01); *G02B 27/0103* (2013.01); *G02B 27/0176* (2013.01); *G02B 27/18* (2013.01); *G02B 2027/0174* (2013.01); *G02B 2027/0178* (2013.01); *G02B 2027/0198* (2013.01)

(58) Field of Classification Search
CPC ............ G02B 27/0172; G02B 27/0103; G02B 27/0176; G02B 27/0179; G02B 27/18; G02B 2027/0174; G02B 2027/0178; G02B 2027/0198; G02B 6/124; G02B 6/34; G02B 6/4204; G02B 6/4214; G02B 7/008; G02B 7/09; G02B 7/023; G06F 3/012; G09G 3/003; G09G 5/00; H04N 13/128; H04N 13/327; H04N 13/344
See application file for complete search history.

(56) References Cited

U.S. PATENT DOCUMENTS

| | | | |
|---|---|---|---|
| 2016/0212888 A1* | 7/2016 | Nikkhoo | ............ G02B 27/0176 |
| 2018/0074578 A1* | 3/2018 | Robbins | .................. G06T 11/60 |
| 2018/0074587 A1 | 3/2018 | Robbins et al. | |
| 2020/0174284 A1* | 6/2020 | Chan | .................. G02F 1/13306 |

FOREIGN PATENT DOCUMENTS

WO    2018213010 A1    11/2018

OTHER PUBLICATIONS

"International Search Report and Written Opinion Issued in PCT Application No. PCT/US2020/017571", dated May 12, 2020, 10 Pages.

* cited by examiner

*Primary Examiner* — Mustak Choudhury
(74) *Attorney, Agent, or Firm* — Holzer Patel Drennan

(57) ABSTRACT

A device disclosed herein includes a display alignment sensing assembly positioned to receive a first signal output from a first display assembly and a second signal output from a second display assembly. A waveguide directs the second signal from the output of the second display assembly to the display alignment sensing assembly where the first signal and the second signal are merged into a combined signal received at an optical sensor. A display alignment tracker detects a positioning disparity between the first signal and the second signal within the combined signal and outputs a rendering position adjustment instruction to correct for the detected positioning disparity.

20 Claims, 5 Drawing Sheets

ACTIVE DISPLAY ALIGNMENT FOR MULTI-DISPLAY DEVICE

BACKGROUND

Augmented reality (AR) technology allows virtual imagery to be mixed with a real-word physical environment. Typically, AR headsets include see-through near-to-eye displays (NEDs) that are worn by users to view the mixed imagery of virtual and real-world objects. In contrast, virtual reality (VR) headsets are designed to immerse the user in a virtual experience. Virtual reality headsets typically include NEDs with opaque backdrops, blocking the user's view of the real world. Experiences enabled by these two different displays differ due to fundamental differences in their optical designs.

The accurate simulation of one or more objects (e.g., holograms) in VR and AR devices relies upon the relative position of a first signal presenting visual information presented to the user's left eye and a second signal presenting visual information presented to the user's right eye. The alignment of these two signals can be affected by a number of factors including thermal influences on optical components.

SUMMARY

An active display alignment system includes a display alignment sensing assembly positioned to receive a first signal output from a first display assembly and a second signal output from a from a second display assembly. A waveguide directs the second signal from the output of the second display assembly to the display alignment sensing assembly where the first signal and the second signal are merged into a combined signal and received at an optical sensor. A display alignment tracker detects a positioning disparity between the first signal and the second signal within the combined signal and outputs a rendering position adjustment instruction to correct for the detected positioning disparity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Current solutions to correct display misalignment in head-mounted display (HMD) devices integrate various optics within a portion of the HMD that rests between a user's eyes or adjacent to the forehead or nose bridge. These solutions tend to drive device thickness, forcing the imaging surfaces (displays) to sit further away from a user's face. An increase in the distance between the user's eyes and imaging surfaces causes a corresponding decrease in the viewing region in space (also sometimes referred to as the "eye box") within which the projected images (e.g., holograms) are visible. Consequently, current solutions that address display misalignment have the consequential effect of decreasing visibility of projected images.

The herein disclosed technology provides a compact architectural solution that facilitates active alignment tracking and adjustment without decreasing the size of the eye box or otherwise impacting visibility of projected images in AR and VR systems.

Figure 1:
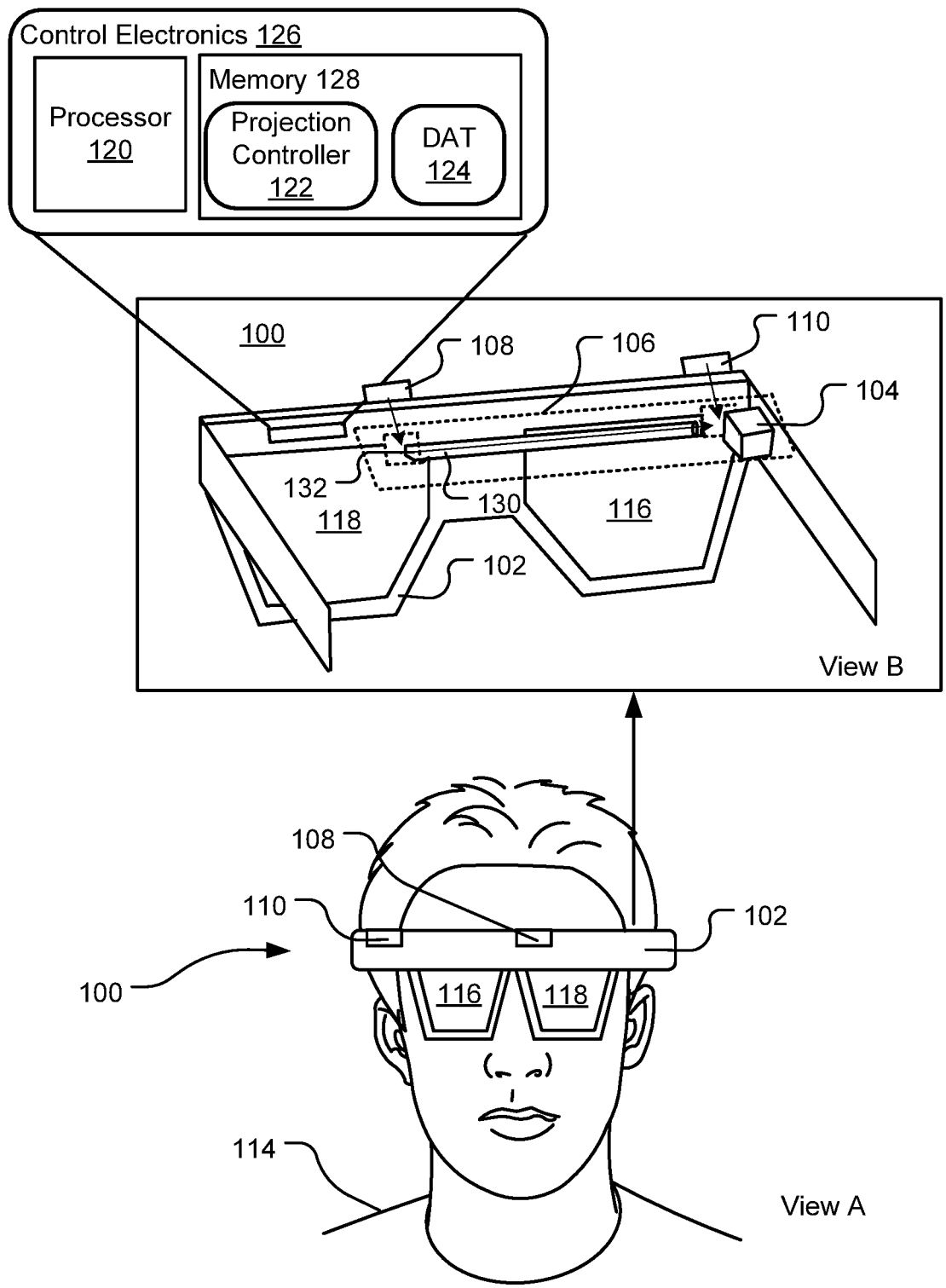
FIG. 1 illustrates a head mounted display (HMD) device implementing an example display alignment tracking and adjustment system.

FIG. 1 illustrates an example head mounted display (HMD) device 100 implementing an example display alignment tracking and adjustment system 106. The HMD device 100 includes a frame 102 that supports various electronics and optical elements including a first display assembly 108 and a second display assembly 110 that each generate and project imagery presented to a different eye of a user 114 (e.g., as shown in View A).

The first display assembly 108 projects a first signal toward a first waveguide combiner 116, and the second display assembly 110 projects a second signal toward a second waveguide combiner 118. Light projected by the display assemblies 108 and 110 is coupled into and through one of the first waveguide combiner 116 and the second waveguide combiner 118, respectively, and after several reflections off interior surfaces, coupled back out of the waveguide combiners 116 and 118 and imaged in the direction of the user 114. After exiting the first waveguide combiner 116 and the second waveguide combiner 118, light may be passed through one or more optical elements (e.g., lenses) that focus the images to a plane visible to the user 114.

As shown with respect to View B of FIG. 1, the HMD device 100 includes control electronics 126 including a processor 120, memory 128, and various applications stored in the memory 128 that are executable by the processor 120. Specifically, the HMD device 100 includes a projection controller 122 that generates control signals to operate a microdisplay (also herein referred to as a projector, not shown) within each of the first display assembly 108 and the second display assembly 110. Each microdisplay generates light that is collimated and angularly encoded such that the center of a pixel on the microdisplay equates to a specific angle in space. The exact angles are defined by the focal length and distortion of a collimating lens and other intrinsic characteristics of the system, such as the orientation of the microdisplay and fold mirrors within the first display assembly 108 and the second display assembly 110. Discrepancies between an azimuth angle, elevation angle, or roll angle of first signal provided by the first display assembly 108 and the azimuth angle, elevation angle, or roll angle of the second signal provided by the second display assembly 110 may appear to a user as misalignments of images in the first signal and the second signal.

In addition to the projection controller 122, the HMD device 100 also includes a display alignment tracker (DAT) 124 that controls various components of the display alignment tracking and adjustment system 106 to actively detect positioning disparities between the signals generated by the display assemblies 108 and 110. Once a positioning disparity is detected, the DAT 124 determines an alignment adjustment instruction and transmits the alignment adjustment instruction to the projection controller 122. Upon receipt of the alignment adjustment instruction, the projection controller 122 implements a real-time microdisplay positioning adjustment to correct for positioning disparity.

The display alignment tracking and adjustment system 106 includes a waveguide 130 positioned to receive the signal output from the display assembly 108. Although a portion of the first signal output by the display assembly 108 is coupled into the second waveguide combiner 118, another portion of this signal passes directly through the second waveguide combiner 118 (e.g., as shown by arrows in View B). This light is coupled into a first end 132 of the waveguide 130 and transmitted toward a display alignment sensing assembly 104 positioned in an output path of light projected by the second display assembly 110.

The display alignment sensing assembly 104 includes at least an optical sensor (not shown) as well as one or more optical components that redirect light to combine the first signal and the second signal prior to receipt at the optical sensor.

After the first signal and the second signal are combined within the display alignment sensing assembly 104, the optical sensor samples a portion of the combined signal and provides the sampled signal data to the display alignment tracker (DAT) 124 for analysis. The DAT 124 compares the received combined signal to an expected signal to determine a differential between the first signal and the second signal (e.g., a detected misalignment). Based on this determined differential, the DAT 124 generates a rendering position adjustment instruction that is, in turn, provided to and executed by the projection controller 122 to adjust a rendering position of one or both of the projected signals, thereby improving signal alignment and clarity of projected images within a field of view of the user 114.

In different implementations, the DAT 124 is capable of correcting signal misalignment due to a variety of causes. For example, misalignment between the first signal and the second signal may be caused by changes in temperature, humidity, or other environmental conditions, as well as by physical impacts to a device and physical degradation of device bonds or components. For example, signal misalignment may result when a user drops the device or subjects the device to other impact or shock. Likewise, signal misalignment may also result due to stresses on and/or relaxation of structural materials that hold the display assemblies 202 and 204 in place. These types of misalignments may not be predictable or corrected by calibration.

In various implementations, the waveguide 130 and the display alignment sensing assembly 104 include different components. In one implementation, the waveguide 130 is an optical fiber that redirects and carries the first signal generated by the display assembly 108 across the frame 102 toward the display alignment sensing assembly 104. For example, the display alignment sensing assembly 104 may be designed to rest adjacent to a user's temple, ear, or somewhere therebetween. This placement of the signal merge location and optical sensor at a location distal to the user's nose and forehead regions allows the HMD device 100 to assume a slimmer form factor in such regions, increasing both comfort and the size of the eye box. According to one implementation, the signals generated by the first display assembly 108 and the second display assembly 110 are combined at a merge location on the HMD device 100 that is designed to rest between eye and ear of the user 114, such as between a left ear and a left eye or between the right ear and the right eye. For example, the first signal may combine with the second signal at a location adjacent to a cheek or temple of the user 114 when the HMD device 100 is worn.

Figure 2A:
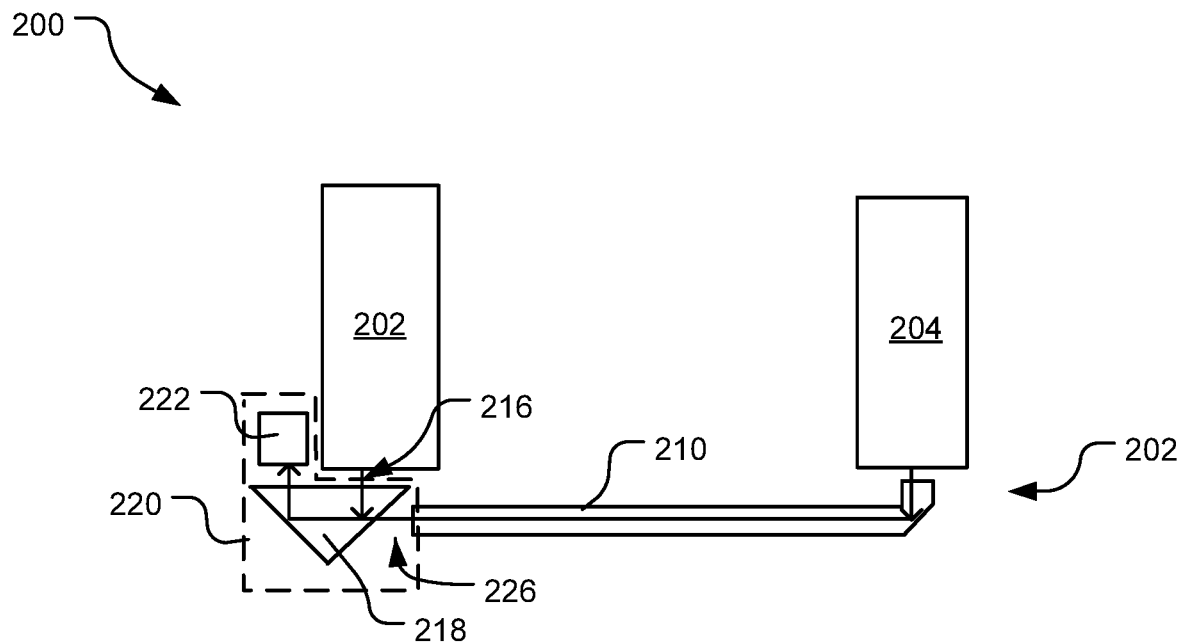
FIG. 2A illustrates a top-down view of an exemplary display alignment tracking and adjustment system.
Figure 2B:
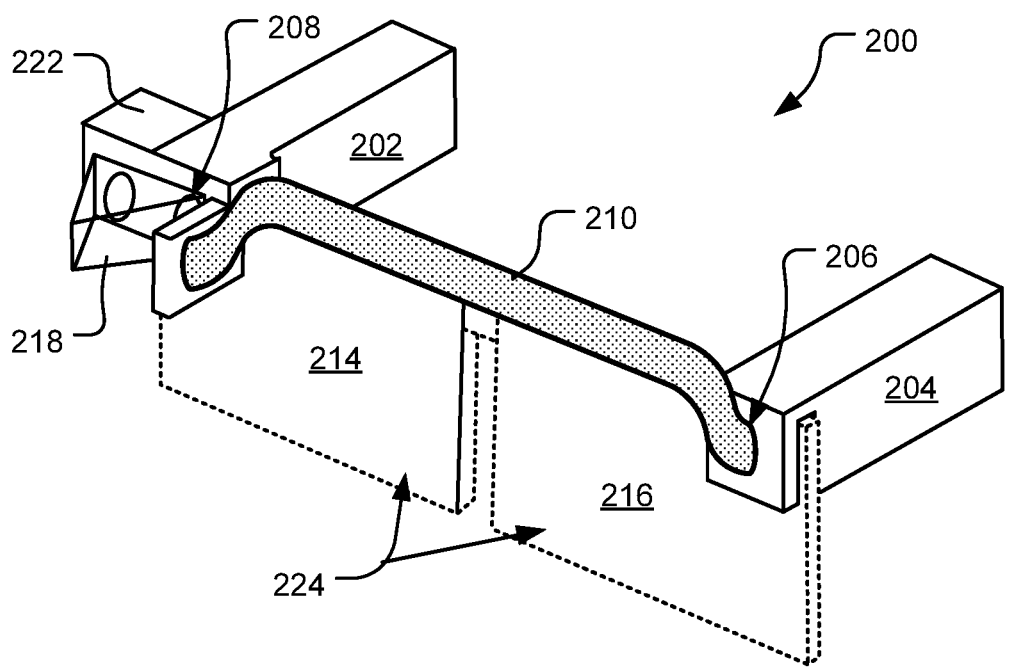
FIG. 2B illustrates a perspective view of the display alignment tracking and adjustment system of FIG. 2A.

FIG. 2A illustrates a top-down view of an exemplary display alignment tracking and adjustment system 200. FIG. 2B illustrates a perspective view of the same display alignment tracking and adjustment system 200 with components of an imaging assembly 224 shown for context in dotted lines. Specifically, the imaging assembly 224 shown in the perspective view of FIG. 2B includes waveguide combiners 214 and 216, which may each be roughly aligned with one of a user's eyes when the system shown is integrated into an HMD device and worn by a user.

The display alignment tracking and adjustment system 200 includes a first display assembly 202 and a second display assembly 204 that each include a projector (not shown) integrated within a housing. The first display assembly 202 and the second display assembly 204 each project light that is redirected and imaged by various components of an imaging assembly 224, which includes at least the waveguide combiners 214 and 216 as well as various lenses and/or other optical imaging elements (not shown).

The housing of each of the first display assembly 202 and the second display assembly 204 includes an aperture (e.g., apertures 206, 208) that is aligned with a light beam output by a corresponding projector internal to the housing. According to one implementation, the display assemblies 202 and 204 are manufactured in an assembly process separate from the assembly of the display alignment tracking and adjustment system 200. For example, this separate assembly process may ensure a precise alignment between a travel direction of light output by each projector and the corresponding aperture 206 and 208 in the housing. This pre-performed pinpoint alignment may simplify a subsequent alignment of the display assemblies 202 and 204 with the various aspects of the display alignment tracking and adjustment system 200 designed to intercept the transmitted light.

In FIG. 2A-2B, the display alignment tracking and adjustment system includes an optical fiber 210 (e.g., an exemplary waveguide) with a first end mated to the aperture 206 of the display assembly 204. When the display alignment tracking and adjustment system 200 is assembled as shown, a first portion of the light transmitted by the display assembly 204 is coupled into the waveguide combiner 216 (e.g., via an input coupling, not shown) and propagated therethrough until exiting through an exit coupling (not shown) and being imaged on a focal plane within the eye box. Another portion of the light emitted by the display assembly 204 passed directly through the waveguide combiner 216 without being affected by the imaging assembly 224. As used herein, light is referred to as "unaffected" by certain optics when it is neither refracted or diffracted by those optics.

The light that passes through the waveguide combiner 216 unaffected is coupled into a first end of the optical fiber 210 (e.g., the end that is mated to the aperture 206 of the display assembly 204). In another implementation, the optical fiber 210 is positioned to intercept light output by the display assembly 204 before the light passes through the waveguide combiner 216.

The optical fiber 210 directs the captured light from the display assembly 204 to an output location 226, where the light is then provided as a first input signal into a display alignment sensing assembly 220. The display alignment sensing display includes at least an optical sensor 222 and one or more optical elements that combine the first input signal with a second signal output by the display assembly 302.

In different implementations, the display alignment sensing assembly 220 includes different components. In FIG. 2, the display alignment sensing assembly 220 includes a prism combiner 218 and an optical sensor 222. The prism combiner 218 is positioned within an output path of the optical fiber 210 and also positioned projection path of the display assembly 202.

Although a portion of the light transmitted by the display assembly 202 is captured into the waveguide combiner 214, propagated within, and imaged in the direction of a user (not shown), another portion of the light transmitted by the display assembly 204 passes through the waveguide combiner 214 unaffected. This light is received as a second input signal to the prism combiner 218. In different implementations, the prism combiner 218 may be a single prism element (as shown) or a collection of elements, such as a collection that includes one or more mirrors and lenses. The prism combiner 218 combines the second input signal from the display assembly 202 with the first input signal from the display assembly 204 and provides the combined signal to the optical sensor 222.

Notably, the transmission of the first signal across the optical fiber 210 introduces a potential to distort the resulting image across variations in temperature. For example, changes in temperature of the optical fiber 210 may affect the position at which the first signal is output from the optical fiber 210 and directed onto the prism combiner 218.

According to one implementation, the display alignment tracking and adjustment system 200 is subjected to a factory calibration performed on a per-device basis. During the calibration, a series of measurements are taken to determine a distortion of the first signal that is measured by the optical sensor 222 at different points in time as the display assembly 204 warms up to a steady state. For each distortion measured, a corresponding pointing adjustment is determined to alter a rendering position of the display assembly 204 in a manner that suffices to correct for the measured signal distortion. From this process, a calibration table is generated and stored in a location accessible by control electronics within the display alignment tracking and adjustment system 200. When the display assemblies 202 and 204 are in use, the control electronics access the calibration table to adjust pointing of the display assembly 204 to correct for distortions due to thermal influences on the optical fiber 210. After this correction is implemented to account for thermal influences on the optical fiber 210, remaining positioning disparities between the first signal and the second signal can be attributed to thermally-related artifacts arising within the display assemblies 202, 204, as described below.

Since the combined signal output by the prism combiner 118 has been corrected for thermal influences on the optical fiber 210 (as described above) and otherwise comprises aspects of the projected light that have been neither diffracted nor refracted by the imaging assembly 224, it can be assumed that any detected misalignment between the first input signal and the second input signal is due to thermal influences internal to the projection optics rather than the imaging assembly 224. In this sense, the display alignment tracking and adjustment system 200 is capable of not only detecting a misalignment within the combined signal received at the optical sensor 222, but also capable of identifying and correcting for signal distortions that are attributable to artifacts internal to the display assemblies 202 and 204.

Notably, since the optical fiber 210 is mated to the display assembly 204, changes in pointing of the display assembly 204 do not alter the signal output from the display assembly 204. For this reason, the implementation of FIG. 2 may not be especially useful in detecting and capturing signal distortions due to vertical and horizontal disparities in pointing between the two projectors within the display assemblies 202 and 204.

In another implementation, the optical fiber 210 has a first end that receives light from the display assembly 204 but that remains unattached to the display assembly 204. In this implementation, the second end of the optical fiber 210 is fixed to the display 202, such as by a structural component of device housing (not shown) that locks movement of the second end of the optical fiber 210 to match that of the display assembly 202. In this scenario, the signals provided to the optical sensor 222 would capture discrepancies in the positioning of the display assemblies 202, 204 relative to one another. Consequently, the display alignment tracking and adjustment system 200 is, in this implementation, capable of detecting and correcting for vertical and horizontal misalignments between the display assemblies 204 and 206.

FIG. 3 (discussed below) provides an alternative implementation that may better detect and correct for these signal distortions due to disparities in pointing of the display assemblies 202 and 204.

In different implementations, the optical sensor 222 may assume different characteristics and forms. In some implementations, the optical sensor 222 may be a single pixel optical sensor. For example, the optical sensor may detect a periodic structure presented in a certain phase through an aperture, and the optical sensor may sense the integrated power of the periodic structure. In other implementations, the optical sensor 222 includes multiple photoreceptors in a photoreceptor array. For example, the optical sensor 222 may be an imaging sensor, such as a charge coupled device (CCD) or a complimentary metal-oxide sensor (CMOS).

In some implementations, the optical sensor 222 includes a plurality of channels on which different colors may be received. For example, the optical sensor 222 may have red, green, and blue channels or yellow, cyan and magenta channels (e.g., configured to detect and/or record light in red, green, and blue wavelengths or yellow, cyan, and magenta wavelengths). In other examples, the optical sensor may have visible wavelength channels and infrared wavelength channels. In still another implementation, the optical sensor 222 has a photoreceptor array that is configured to receive signal on a signal channel such as a blue channel, an infrared channel, etc.

In different implementations, the optical sensor 222 may be selectively controlled to sample different portions of the combined signal output by the combiner prism 218, which may include any portion of the first signal and the second signal. In some implementations, the first signal and the second signal include a test pattern that allows control electronics (e.g., the DAT 124 of FIG. 1) to search for alignment of the test pattern of the first signal and of the second signal. Corrective adjustments to the pointing of the display assemblies 202 and 204 can be then be determined and actively implemented.

Figure 3A:
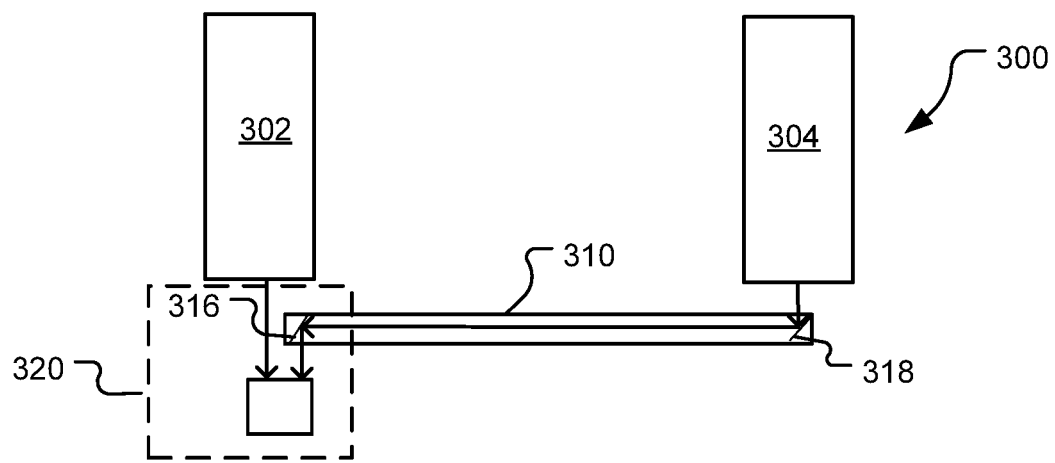
FIG. 3A illustrates a top-down view of another exemplary display alignment tracking and adjustment system.
Figure 3B:
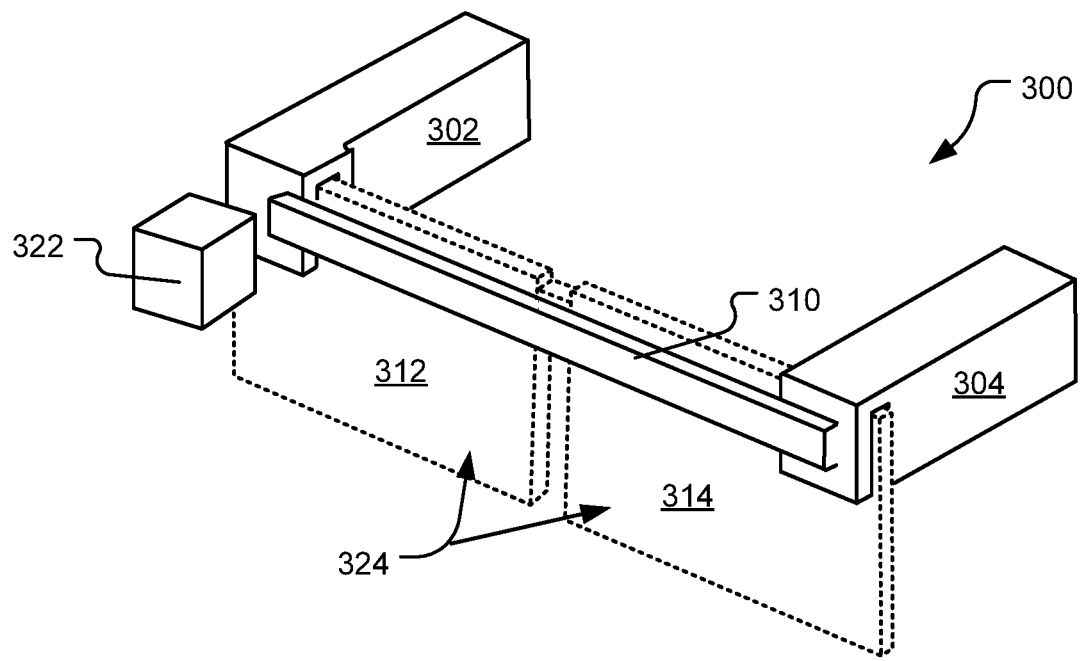
FIG. 3B illustrates a perspective view of the display alignment tracking and adjustment system of FIG. 3A.

FIG. 3A illustrates a top-down view of components included within another exemplary display alignment tracking and adjustment system 300. FIG. 3B illustrates a perspective view of the same display alignment tracking and adjustment system 300 with components of an imaging assembly 324 shown for context in dotted lines. Specifically, the imaging assembly 324 shown in the perspective view of FIG. 2B includes waveguide combiners 312 and 314, which may each be aligned with one of a user's eyes when the system is integrated into an HMD device.

The display alignment tracking and adjustment system 300 includes a first display assembly 302 and a second display assembly 304. According to one implementation, each of the first display assembly 302 and the second display assembly 304 include a housing encasing a projector that outputs a signal through an associated aperture (not shown) toward a waveguide combiner 312 or 314. Light emitted by the display assemblies 302 and 304 is imaged by an imaging assembly 324 onto a focal plane visible to a user.

The display alignment tracking and adjustment system 300 includes a surface relief grating (SRG) plate 310 positioned in a path of light output by the display assembly 304. The term "surface relief grating" (SRG) refers to periodic surface variations formed in the surface of an optical element. For example, an SRG may include uniform straight grooves in a surface of an optical component that are separated by uniform straight groove spacing regions. Groove spacing regions can be referred to as "lines", "grating lines" or "filling regions." The nature of diffraction caused by an SRG depends on the wavelength, polarization and angle of light incident on the SRG and various optical characteristics of the SRG, such as refractive index, line spacing, groove depth, groove profile, groove fill ratio and groove slant angle.

SRGs have many useful applications. One example is an SRG light guide application. A light guide is an optical component used to transport light by way of internal reflection (e.g. total internal reflection) within the light guide. A light guide may be used, for instance, in a light guide-based display system for transporting light of a desired image from a light engine to make the image visible to the eye. In-coupling and outcoupling SRGs on surface(s) of the light guide can be used for inputting light to and outputting light from the waveguide respectively.

As used herein, the term "SRG plate" refers to an optical element with SRGs formed in one or more surfaces. In FIG. 3, the SRG plate 310 is a transparent substrate (e.g., glass or plastic) with SRGs forming an input coupling 318 and an exit coupling 316. The SRG plate 310 guides light output from the display assembly 304 to a display alignment sensing assembly 320, described further below.

The SRG plate 310 has a first end with an input coupling 318 positioned to receive a signal output by the display assembly 304 and a second end with an exit coupling 316 positioned to pass the signal to a display alignment sensing assembly 320. In operation, a portion of the light output by the display assembly 304 is captured into the waveguide combiner 314 and imaged in the direction of a user. Another portion of the light output by the display assembly 304 passes directly through the waveguide combiner 314 and into the SRG plate 310 via the input coupling 318. This light is unaffected by the waveguide combiner 314. The SRG plate 310 directs the signal captured from the display assembly 304 to the exit coupling 316 where the light is then provided as a first input signal to the display alignment sensing assembly 320.

In another implementation, the SRG plate 310 is positioned to intercept light output by the display assembly 304 before the light enters the waveguide combiner 314.

In FIG. 3, the display alignment sensing assembly 320 is formed by an exit coupling 316 of the SRG plate 310 and an optical sensor 322. The exit coupling 316 of the SRG plate 310 transposes the signal exiting the SRG plate 310 on top of light propagating from the first display assembly 302. The optical sensor 322 is positioned within a path of the signal output by the SRG plate 310 and also positioned in the projection path of a signal output by the display assembly 302. Although a portion of the light transmitted by the display assembly 302 is captured into the waveguide combiner 312 and imaged in the direction of a user (not shown) by other components of the imaging assembly 324, another portion of the light transmitted by the display assembly 304 is unaffected by the imaging assembly 324. This light passes directly through the second waveguide combiner 312 and to the optical sensor 322.

Notably, the transmission of light across the SRG plate 310 may introduce distortions to the resulting light that vary along with variations in temperature. According to one implementation, the display alignment tracking and adjustment system 300 is subjected to a factory calibration during which pointing corrections are determined to correct for thermal influences on the SRG plate 310, such as in the same or similar manner described with respect to the corrective pointing adjustments based on time/temperature variations in the optical fiber described with respect to FIG. 3. For each distortion measured, a corresponding pointing adjustment is determined to alter a pointing of the display assembly 304 in a manner that suffices to correct for the measured distortion. From this process, a calibration table is generated and stored in a location accessible by control electronics within the display alignment tracking and adjustment system 300. When the display assemblies 302 and 304 are in use, the control electronics access the calibration table to determine an adjustment to the rendering position of one or both of the display assemblies 302 and 304 to correct for distortions due to thermal influences on the SRG plate 310.

After this correction is implemented to account for thermal influences on the SRG plate 310, remaining disparities between the first signal and the second signal captured at the optical sensor 322 can be attributed to pointing of the display assemblies 302, 304 and/or thermally-related distortions occurring within the display assemblies 302, 304. For example, a signal misalignment detected by the display alignment and tracking system 300 may be uniquely attributed to optical distortions occurring inside of the display assemblies 302 and 304 as well as changes in the pointing of the display assemblies 302 and 304 due to thermal expansion and/or contraction of the display assemblies and their internal components.

In one implementation, the SRG plate 310 is structurally coupled to one or both of the waveguide combiners 312 and 314 but unattached to the display assemblies 302 and 304. For example, a flat back surface of the SRG plate 310 may be bonded to an adjacent surface of the waveguide combiners 312 and 314 or to components of a device frame (not shown), while remaining unattached to (e.g., floating relative to) the display assemblies 302 and 304. In this implementation, light received at the optical sensor 322 may capture distortions due to thermal artifacts that are both internal to the display assemblies 302, 304 (e.g., as described above with respect to the implementation of FIG. 2) as well as for thermal influences that may affect the vertical and horizontal signal disparity of the display assemblies 302, 304 relative to one another. Accordingly, this implementation may beneficially permit detection and correction of thermally-induced disparities in the pointing of the display assemblies 302 and 304 relative to each other as well as detection and correction of signal disparities caused by artifacts internal to the display assemblies 302 and 304 (e.g., on projection optics). In another implementation, the SRG plate 310 is structurally coupled to both of the display assemblies 302 and 304.

Aspects of the optical sensor 322 or other elements of the display alignment and tracking and adjustment system 300 not described specifically with respect to FIG. 3 may be the same or similar as those described with respect to other implementations described herein.

Figure 4:
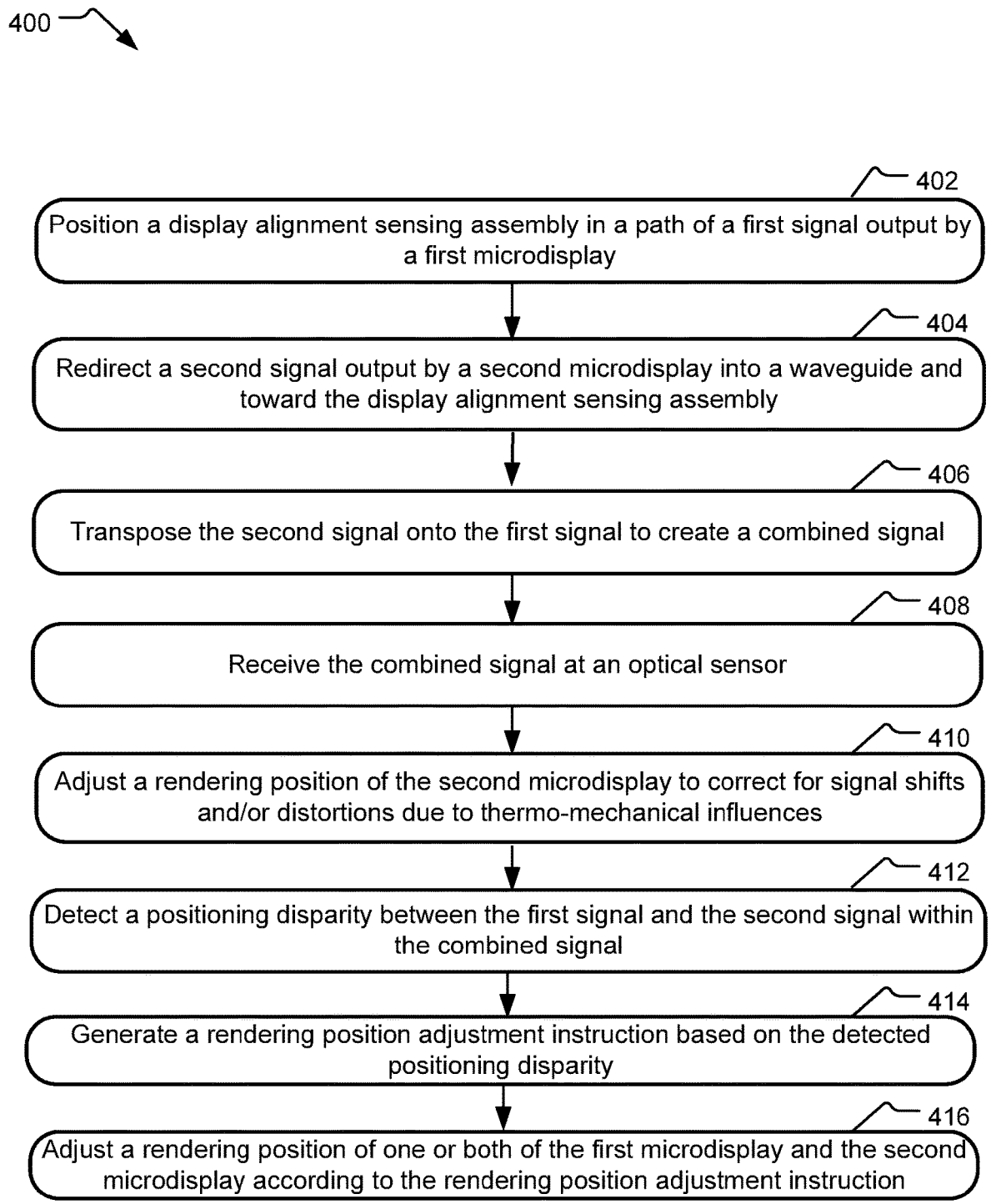
FIG. 4 illustrates example operations for utilizing a display alignment and tracking system to detect and actively correct for disparities in the rendering positions of two projected signals.

FIG. 4 illustrates example operations for utilizing a display alignment and tracking system to detect and actively correct for disparities in the rendering positions of two projected signals. A first positioning operation 402 positions a sensing assembly in a path of a first signal output by a first microdisplay. The display alignment sensing assembly includes at least an optical sensor and may additionally include one or more elements for selectively combining the two projected signals and/or for directing the combined signal toward the optical sensor.

A direction operation 404 directs a second signal output by a second microdisplay into a waveguide that is positioned to redirect the second signal toward the display alignment sensing assembly. In one implementation, the waveguide redirects the second signal in a direction substantially perpendicular to its original direction of propagation when output from the second microdisplay, such as by directing the signal across a front portion of an HMD device frame (e.g., from a location proximal to a user's first eye to a location proximal to the user's opposite eye). In one implementation, the waveguide is a flexible fiber optic cable. For example, the fiber optic cable may couple to an aperture in an assembly including the second microdisplay, receive the emitted light signal and an output of the assembly, and transport the signal to a merge within the display alignment sensing assembly. In another implementation, the waveguide is a rigid SRG plate element that delivers the second signal to the signal merge location according to the same or similar optical principles.

A signal transposition operation 406 transposes the second signal onto the first signal at the merge location, creating a combined signal. In one implementation, the signal transposition is performed by a prism combiner positioned at the merge location (e.g., as shown in FIGS. 2A-2B). In another implementation, the signal transposition is performed by one or other optical elements, such as by an output coupling in the waveguide that outputs the second signal on top of the first signal (e.g., as shown in FIGS. 3A-3B). A receiving operation 408 receives the combined signal at an optical sensor included within the display alignment sensing assembly.

An adjustment operation 410 adjusts a rendering position of the second microdisplay to correct for signal shifts and/or distortions due to thermo-mechanical influences on the microdisplays and/or the waveguide. For example, adjustment operation 410 may determine a current temperature and/or time that the microdisplays have been powered on and, based on such parameters, retrieve a corresponding positioning adjustment from a calibration table created during a factory calibration. This positioning adjustment may alter a positioning disparity between the first signal and the second signal within the combined signal.

A detection operation 412 detects a positioning disparity between the first signal and the second signal within the combined signal. In one implementation, the detection operation 412 detects the positioning disparity based on a detected a location of a test pattern included within the first signal and the second signal. An instruction generation operation 414 generates a rendering position adjustment instruction for adjusting at least one of the first microdisplay and the second microdisplay based on the detected positioning disparity. In one implementation, a test pattern is included within the first signal and the second signal and a coordinate differential in the test pattern is used to displace the first signal or the second signal in azimuth, elevation, or roll such that a projected coordinate position of the test pattern is equivalent in both signals. In another implementation, a dimensional differential in the test pattern is used to stretch one or both of the signals in azimuth, elevation, or roll such that the projected coordinate position of the test pattern is equivalent in both signals.

Figure 5:
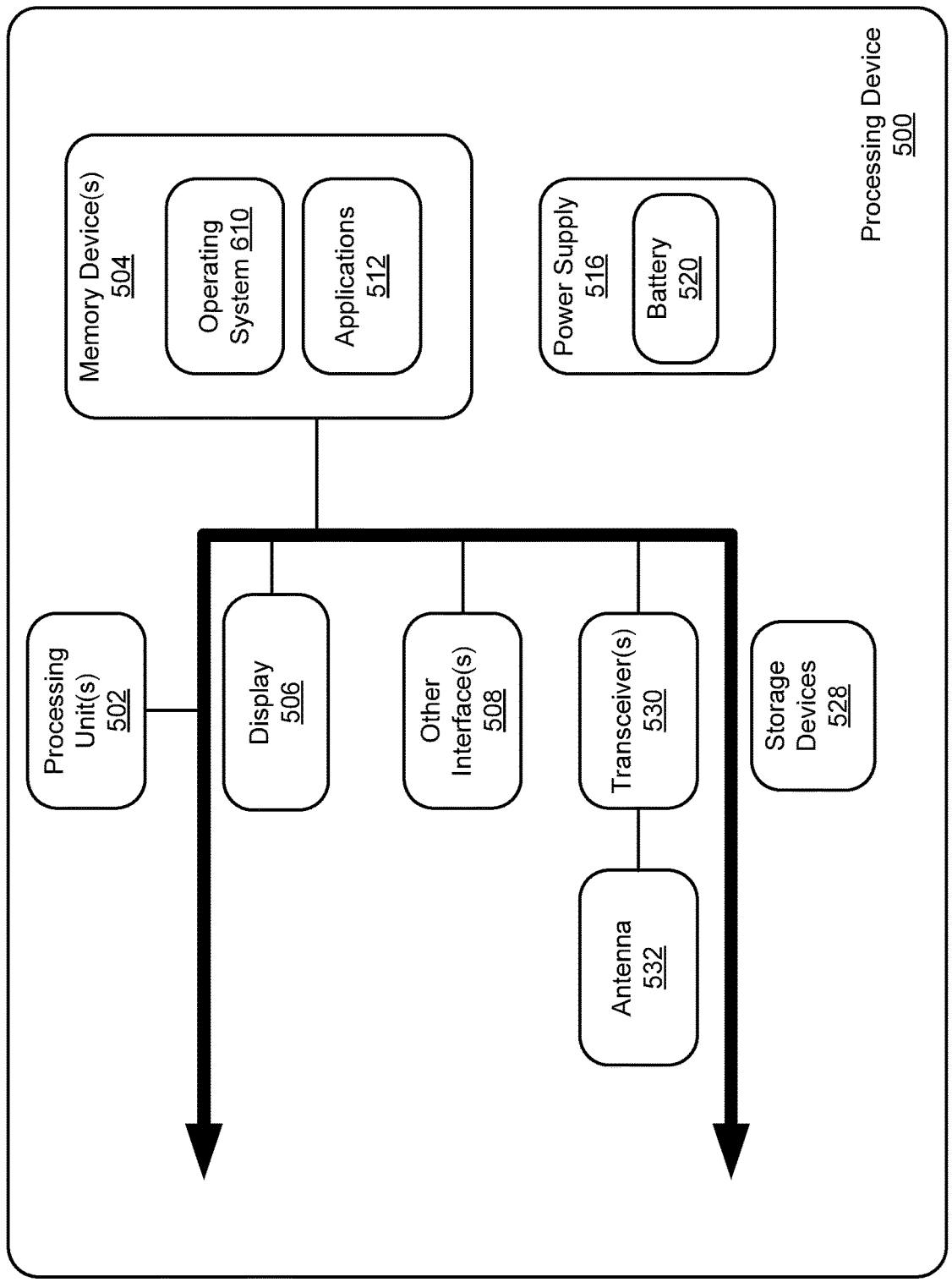
FIG. 5 illustrates an example schematic of a processing device suitable for implementing aspects of the disclosed technology.

An adjustment operation 416 adjusts a rendering position of one or both of the first microdisplay and the second microdisplay according to the rendering position adjustment instruction FIG. 5 illustrates an example schematic of a processing device 500 suitable for implementing aspects of the disclosed technology. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, such as a projection controller (e.g., projection controller 122 of FIG. 1) or a display alignment tracker (e.g., the DAT 124 of FIG. 1) are loaded in the memory 504 and executed on the operating system 510 by the processor unit(s) 502. The applications 512 may receive input from various input devices such as a microphone 534 or input accessory 535 (e.g., remote, keypad, mouse, stylus, touchpad). The processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, Bluetooth®). The processing device 500 may also include various other components, such as a positioning system (e.g., a global positioning satellite transceiver), one or more accelerometers, one or more cameras, an audio interface (e.g., microphone 534, an audio amplifier and speaker and/or audio jack), and storage devices 528. Other configurations may also be employed.

In an example implementation, the display 506 is a VR or AR display with imagery generated by two projectors (microdisplays) that run in parallel. Signal controls for the two projectors are generated by a projection controller and signal adjustment instructions are generated by a DAT. Both of the projection controller and the DAT include hardware and/or software embodied by instructions stored in memory 504 and/or storage devices 528 and processed by the processor unit(s) 502. The memory 504 may be memory of host device or of an accessory that couples to a host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media, such as a wired network or direct-wired connection, and wireless media such as acoustic, RF, infrared and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes at least a display alignment assembly, a waveguide, and a display alignment tracker. The display alignment sensing assembly receives a first signal output from a first display assembly, and the waveguide receives second signal output from a second display assembly. The waveguide redirects the second signal to the display alignment sensing assembly, and the display alignment sensing assembly includes an optical sensor that receives a combined signal including the first signal and the second signal. The display alignment tracker analyzes the combined signal to detect a positioning disparity between the first signal and the second signal and outputs a rendering position adjustment instruction to correct for the detected positioning disparity.

In one example system according to any preceding system, the display alignment sensing assembly includes a prism combiner positioned to receive the first signal from the first display assembly and the second signal from the waveguide. The prism combiner is configured to combine the first signal with the second signal to generate the combined signal.

In another example system according to any preceding system, the waveguide is an SRG plate.

In yet still another example system according to any preceding system, the waveguide is an optical fiber.

In yet still another example system of any preceding system, the display alignment tracker is further executable to determine a corrective adjustment to adjust a rendering position of at least one of the first display assembly and the second display assembly to correct for thermal influences on the waveguide. The combined signal is generated based on the corrective adjustment.

In yet still another example system of any preceding system, the second signal received at the waveguide is unaffected by optical elements between the second display assembly and the waveguide.

In still another example system of any preceding system, the second signal is intercepted by the waveguide while traveling in a first direction and the waveguide redirects the second signal in a direction substantially parallel to the first direction.

Yet still another example system of any preceding system is incorporated within a head-mounted display (HMD) device that includes a frame for supporting the system on a head of a user, the display alignment sensing assembly being adjacent to a region of the frame adapted to rest between an eye and a corresponding ear of a user wearing the HMD device.

An example method disclosed herein provides for directing a first signal received as output from a first display assembly to a display alignment sensing assembly and redirecting a second signal received as output from a second display assembly through a waveguide and toward the display alignment sensing assembly. The display alignment sensing assembly includes an optical sensor that receives a combined signal including both the first signal and the second signal. The method further provides for detecting a positioning disparity between the first signal and the second signal within the combined signal and adjusting a rendering position for at least one of the first display assembly and the second display assembly based on the detected positioning disparity.

In another example method of any preceding method, the display alignment sensing assembly includes a prism combiner positioned to receive the first signal from the first display assembly and the second signal from the waveguide. The prism combiner is configured to combine the first signal with the second signal to generate the combined signal.

In yet still another example method of any preceding method, the method includes determining a corrective adjustment to reposition at least one of the first display assembly and the second display assembly to correct for thermal influences on the waveguide. The combined signal is generated based on the corrective adjustment.

In yet still another example method of any preceding method, the waveguide is an SRG plate.

In yet still another example method of any preceding method, the waveguide is an optical fiber.

In still another example method of any preceding method, the first display assembly is integrated within a first display housing and the optical fiber has an end mated with an aperture in the first display housing.

In another example method of any preceding method, movement of the waveguide is fixed relative to the first display assembly and not fixed relative to the second display assembly.

An example head-mounted display (HMD) device disclosed herein includes a frame adapted for wearable attachment to a human head, a display alignment sensing assembly mounted to the frame and positioned to receive a first signal propagating along an output path of a first display assembly, and a waveguide positioned to receive a second signal propagating along an output path of a second display assembly and to redirect the second signal to the display alignment sensing assembly. The display alignment sensing assembly includes an optical sensor positioned to receive a combined signal including the first signal and the second signal, and the HMD device further includes a display alignment tracker configured to detect a positioning disparity between the first signal and the second signal within the combined signal and to output a rendering position adjustment instruction to correct for the detected positioning disparity.

In an example HMD device of any preceding HMD device, the waveguide is a surface relief grating (SRG) plate.

In still another example HMD device of any preceding HMD device, the waveguide is an optical fiber.

In another example HMD device of any preceding HMD device, the first signal and the second signal are combined at a merge location proximal to a portion of the frame designed to rest between an eye and an ear of the human head.

In yet another example HMD device of any preceding HMD device, the second signal received at the waveguide is unaffected by optical elements between the second display assembly and the waveguide.

An system disclosed herein includes a means for directing a first signal received as output from a first display assembly to a display alignment sensing assembly and a means for redirecting a second signal received as output from a second display assembly through a waveguide and toward the display alignment sensing assembly. The display alignment sensing assembly includes a means for receiving a combined signal including both the first signal and the second signal. The system further includes a means for detecting a positioning disparity between the first signal and the second signal within the combined signal and adjusting a rendering position for at least one of the first display assembly and the second display assembly based on the detected positioning disparity.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. An active display alignment system comprising:
   a display alignment sensing assembly to receive a first signal output from a first display assembly, the display alignment sensing assembly being incorporated into a frame of a head mounted display (HMD) device at a position distal to a face of a user wearing the HMD device;
   a waveguide to receive a second signal output from a second display assembly and to redirect the second signal to the display alignment sensing assembly, the display alignment sensing assembly including an optical sensor to receive a combined signal including the first signal and the second signal; and
   a display alignment tracker stored in memory of a storage device, the display alignment tracker being executable to detect a positioning disparity between the first signal and the second signal within the combined signal and to output a rendering position adjustment instruction to correct for the detected positioning disparity.

2. The active display alignment system of claim 1, wherein the display alignment sensing assembly includes a prism combiner positioned to receive the first signal from the first display assembly and the second signal from the waveguide, the prism combiner being configured to combine the first signal with the second signal to generate the combined signal.

3. The active display alignment system of claim 1, wherein the waveguide is a surface relief grating (SRG) plate.

4. The active display alignment system of claim 1, wherein the waveguide is an optical fiber.

5. The active display alignment system of claim 1, wherein the display alignment tracker is further executable to:
   determine a corrective adjustment to adjust a rendering position of at least one of the first display assembly and the second display assembly to correct for thermal influences on the waveguide, the combined signal being generated based on the corrective adjustment.

6. The active display alignment system of claim 1, wherein the second signal received at the waveguide is unaffected by optical elements between the second display assembly and the waveguide.

7. The active display alignment system of claim 1, wherein the second signal is intercepted by the waveguide while traveling in a first direction and the waveguide redirects the second signal in a direction substantially perpendicular to the first direction.

8. The active display alignment system of claim 1, wherein the display alignment sensing assembly is adjacent to a region of the frame adapted to rest between an eye and a corresponding ear of the user wearing the HMD device.

9. A method comprising:
directing a first signal received as output from a first display assembly to a display alignment sensing assembly, the display alignment sensing assembly being incorporated into a frame of a head mounted display (HMD) device at a position distal to a face of a user wearing the HMD device;
redirecting a second signal received as output from a second display assembly through a waveguide and toward the display alignment sensing assembly, the display alignment sensing assembly including an optical sensor that receives a combined signal including both the first signal and the second signal;
detecting a positioning disparity between the first signal and the second signal within the combined signal; and
adjusting a rendering position for at least one of the first display assembly and the second display assembly based on the detected positioning disparity.

10. The method of claim 9, wherein the display alignment sensing assembly includes a prism combiner positioned to receive the first signal from the first display assembly and the second signal from the waveguide, the prism combiner being configured to combine the first signal with the second signal to generate the combined signal.

11. The method of claim 9, further comprising:
determining a corrective adjustment to reposition at least one of the first display assembly and the second display assembly to correct for thermal influences on the waveguide, the combined signal being generated based on the corrective adjustment.

12. The method of claim 9, wherein the waveguide is a surface relief grating (SRG) plate.

13. The method of claim 9, wherein the waveguide is an optical fiber.

14. The method of claim 13, wherein the optical fiber has an end mated with an aperture in the first display assembly.

15. The method of claim 9, wherein movement of the waveguide is fixed relative to the first display assembly and not fixed relative to the second display assembly.

16. A head-mounted display (HMD) device comprising:
a frame adapted for wearable attachment to a human head;
a display alignment sensing assembly mounted to the frame at a position distal to a face of a user wearing the HMD device, the first display alignment sensing assembly being positioned to receive a first signal propagating along an output path of a first display assembly;
a waveguide positioned to receive a second signal propagating along an output path of a second display assembly and to redirect the second signal to the display alignment sensing assembly, the display alignment sensing assembly including an optical sensor positioned to receive a combined signal including the first signal and the second signal; and
a display alignment tracker stored in memory and configured to detect a positioning disparity between the first signal and the second signal within the combined signal and to output a rendering position adjustment instruction to correct for the detected positioning disparity.

17. The HMD device claim 16, wherein the waveguide is a surface relief grating (SRG) plate.

18. The HMD device of claim 16, wherein the waveguide is an optical fiber.

19. The HMD device of claim 16, wherein the first signal and the second signal are combined at a merge location proximal to a portion of the frame designed to rest between an eye and an ear of the human head.

20. The HMD device of claim 16, wherein the second signal received at the waveguide is unaffected by optical elements between the second display assembly and the waveguide.

* * * * *